US008591312B2

(12) United States Patent
Roukis et al.

(10) Patent No.: US 8,591,312 B2

(45) Date of Patent: Nov. 26, 2013

(54) GAMING SYSTEM WITH SUSPENSE FEATURE

(75) Inventors: George Roukis, Lane Cove (AU); Scott Olive, Lane Cove (AU)

(73) Assignee: Aristocrat Technologies Australia Pty Ltd (AU)

( * ) Notice: Subject to any disclaimer, the term of this patent is extended or adjusted under 35 U.S.C. 154(b) by 751 days.

(21) Appl. No.: 11/748,998

(22) Filed: May 15, 2007

(65) Prior Publication Data

US 2008/0064478 A1 Mar. 13, 2008

(30) Foreign Application Priority Data

May 16, 2006 (AU) ................................ 2006902599

(51) Int. Cl.
*A63F 13/00* (2006.01)

(52) U.S. Cl.
USPC ............................................................. 463/20

(58) Field of Classification Search
USPC ...................................................... 463/16–20
See application file for complete search history.

(56) References Cited

U.S. PATENT DOCUMENTS

| | | | | |
|---|---|---|---|---|
| 2004/0048662 | A1 * | 3/2004 | Ulmer | 463/30 |
| 2004/0185927 | A1 * | 9/2004 | Baerlocher et al. | 463/16 |
| 2004/0242316 | A1 | 12/2004 | Oles et al. | |
| 2005/0003880 | A1 * | 1/2005 | Englman et al. | 463/16 |
| 2005/0038880 | A1 * | 2/2005 | Danforth | 709/222 |
| 2007/0149276 | A1 | 6/2007 | Iwamoto et al. | |
| 2007/0213114 | A1 | 9/2007 | Caspers et al. | |

FOREIGN PATENT DOCUMENTS

| | | | |
|---|---|---|---|
| AU | 2004201852 | A1 | 11/2004 |
| GB | 2353128 | A * | 2/2001 |
| WO | 03020385 | A1 | 3/2003 |

* cited by examiner

*Primary Examiner* — David L Lewis
*Assistant Examiner* — Eric M Thomas
(74) *Attorney, Agent, or Firm* — McAndrews, Held & Malloy, Ltd.

(57) ABSTRACT

A method of operating a gaming apparatus having a display means and a user interface in communication with a game control means. The method includes determining a selection of an outcome from at least two possible outcomes and subsequently revealing an award. An event having an event outcome is generated. Whether the award is awarded is represented as dependent on the basis of a comparison or interplay between the selected outcome and the event outcome.

10 Claims, 9 Drawing Sheets

212

| Fish | Chances |
|---|---|
| Yellow fish 1 | 100 |
| Yellow fish 2, 3, 4, 5 | 50 |
| Red fish | 30 |

213

| | Yellow fish (levels) | Red fish (picks) |
|---|---|---|
| 2 | 2 | 2 |
| 3 | 2 | 2 |
| 4 | 1 | 1 |
| 5 | 1 | 1 |

GAMING SYSTEM WITH SUSPENSE FEATURE

RELATED APPLICATIONS

This application claims priority to an Australian patent application filed on May 16, 2006, as serial number AU2006902599, entitled "Gaming System with Suspense Feature," which is herein incorporated by reference in its entirety.

FIELD OF THE INVENTION

The present invention relates to gaming apparatus and methods of gaming. In particular, the present invention relates to a gaming system and to a method of gaming implemented by a gaming system. More particularly, but not exclusively, the present invention relates to a gaming machine that implements a game with an award feature.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

In addition, it is important that a player be able to understand the operation of a game quickly so that the player promptly feels that they are in control of game play and can therefore extract maximum entertainment from the game.

One strategy employed by gaming machine manufacturers in an effort to attract and to maintain player interest is to include various types of feature games that may be triggered from the spinning reel or base game.

There are a number of different feature games having pick-a-box type features, in which a prize is revealed in response to boxes being picked or matched.

In such games, prizes are normally revealed directly after a box or series of boxes has been correctly picked or matched. Games having reveal symbols generally operate in the same manner, in that a prize or award is revealed on selection of a symbol or combination of symbols.

Another type of known feature game is a game (see e.g. AU 715516) in which players select a plurality of elements or zones which together form a matrix. These elements change once they are selected by a player and reveal a particular prize value. In the event of a winning alignment of zones, a prize that is representative of the sum of the revealed prize values is awarded to the player. Only once the selection process has been completed by the player is the quantum of the prize value able to be determined.

In either of the above types of feature games disclosed, there tends to be a lack of player involvement and suspense after many successive iterations of the games, in the sense that a player is either made aware of a potential or actual award either before a selection or 'pick' step or series of steps, or immediately thereafter.

Any reference in this specification to the prior art does not constitute an admission that such prior art was well known or forms part of the common general knowledge in any jurisdiction.

SUMMARY OF THE INVENTION

According to one aspect of the invention, there is provided a gaming machine comprising at least one display and a user interface in communication with a game controller, the gaming machine providing a game in which:

a player of the gaming machine stakes a wager on one or more outcomes of the game and the gaming machine displays on a said display symbols representing the one or more outcomes;

if a winning combination of symbols occurs in at least one of the outcomes on which the player has staked a wager, the gaming machine awards an award associated with that winning combination;

on occurrence of a trigger event during play of the game, a second screen feature game is displayed on a said display, the second screen feature game comprising a plurality of potential prizes arranged in a scale of prizes and a series of game events, wherein for each game event in the series the player is given a choice between least two options, the gaming machine detecting operation of the user interface to determine which option is selected;

in the second screen feature game, the game controller makes a random determination as to whether the player has made a winning choice, and what prize is won if the player choice is a winning choice, wherein the prizes available for selection comprise at least two different values of movement along the scale of prizes and at least two different values of additional events to be added to the series of game events; and on completion of the second screen feature, the gaming machine awards a prize from the scale depending on where on the scale of prizes the feature ended.

In one embodiment, the scale of prizes comprises at least one prize that is a multiplier for a bonus game that is provided by the gaming machine following completion of the second screen feature. In this embodiment, the bonus game may comprise a series of individual game plays, each involving the gaming machine displaying on a said display symbols representing the one or more outcomes, wherein if a winning combination of symbols occurs in at least one of those outcomes the gaming machine may award a prize comprising a predefined value associated with the winning combination multiplied by a said multiplier that has been awarded at the completion of the second screen feature. Also, the bonus game may have the same screen format as the game in which the trigger event may occur. Furthermore, the bonus game and the game in which the trigger event may occur may both be spinning reel games and are both displayed on the same display. Still further, the bonus game may be a series of spins of the reels in the spinning reel game for which the player does not have to stake an additional wager.

In one embodiment, the scale of prizes comprise prizes that progressively increase in value and wherein during the second screen feature it is only possible to either remain at the same position on the scale or move along the scale of prizes to a higher value prize.

In one embodiment, the second screen feature comprises an animation sequence that represents the determination as to whether the player has made a winning choice.

According to another aspect of the invention, there is provided a method of operating a gaming apparatus having a display means and a user interface in communication with a game control means, the gaming apparatus providing a game in which representations of game plays are displayed on the display means that indicate whether or not a winning event has occurred, the method comprising:

determining a selection of an outcome from at least two possible outcomes;

subsequently revealing an award, wherein the revealed award is one of a plurality of possible awards that may be revealed;

generating an event having an event outcome; and then determining whether to award the revealed award and displaying on the display means representations indicative of the determination on the basis of a comparison or interplay between the selected outcome and the event outcome.

In one embodiment of the method, the event outcome is a random selection of one of said at least two possible outcomes and wherein the step of determining whether to award the revealed award comprises comparing the selection determined before the award was revealed and the outcome of the random selection.

In one embodiment of the method, the process of displaying on the display means representations indicative of the determination of whether to award the revealed award occurs over a visually appreciable suspense period between the revelation of the award and the awarding or non-awarding of the award. In this embodiment, during the suspense period, an animation sequence may be displayed on the display means, the animation sequence comprising the representations indicative of the determination of whether to award the revealed award. Also, the animation sequence may comprise an animated award symbol that represents the revealed award and a representation of the selected outcome, wherein the award symbol and representation of the selected outcome interact to indicate the determination of whether the revealed award is to be awarded.

In one embodiment of the method, the method further comprises determining which of the plurality of possible awards to reveal according to a random selection process. In this embodiment, the plurality of possible awards may comprise at least two award types, selected from a group including repeat-type awards, progressive-type awards, monetary prize values, free games, multipliers, credits, jackpots, and non-monetary prizes. Also, the random selection process may comprise randomly determining an award type and randomly determining an award quantum.

In one embodiment of the method, the process of determining a selection of an outcome from at least two possible outcomes comprises determining the selection dependent on operation of the user interface. Alternatively, the process of determining a selection of an outcome from at least two possible outcomes comprises determining the selection dependent on a random selection process.

In one embodiment of the method, the processes of determining a selection of an outcome from at least two possible outcomes, revealing an award, generating an event having an event outcome, and determining whether to award the revealed award are repeated a plurality of times and wherein the method comprises awarding a final award that is dependent on any of the revealed awards that are awarded. In this embodiment, the final award may be an operator on one or more game events and the method further comprises playing the one or more game events and applying the operator to those game events.

In one embodiment of the method, the revealed award is an operator on one or more game events and when the revealed award is awarded, the method further comprises subsequently playing the one or more game events and directly or indirectly applying the operator to the one or more game events.

According to a third aspect of the invention, there is provided a gaming machine comprising at least one display and a user interface in communication with a game controller, wherein:

the game controller receives inputs from the user interface and determines from the inputs a wager that is to be staked on one or more outcomes of the game;

following the staking of a said wager, the game controller determines the one or more outcomes of the game;

the game controller controls a said display to display symbols representing the one or more outcomes;

the game controller determines if a winning combination has occurred in at least one of the outcomes on which the player has staked a wager and causes the gaming machine to award an award associated with that winning combination;

the game controller monitors for occurrence of a trigger event during play of the game and in response, implements a second screen feature game comprising a series of game events and causes representations of the second screen feature to be displayed on a said display;

the gaming machine has in memory a definition of a plurality of potential prizes that together define a scale of prizes;

the user interface comprises a selector and for each game event in the series of game events, the game controller determines from operation of the selector a choice of one of a plurality of options;

the game controller makes a random determination as to whether the player has made a winning choice, and a random selection as to what award is won if the player choice is a winning choice, wherein the awards available for selection comprise at least two different values of movement along the scale of prizes and at least two different values of additional events to be added to the series of game events; and on completion of the second screen feature, the gaming machine awards a prize from the scale depending on where on the scale of prizes the feature ended.

According to a fourth aspect of the invention, there is provided a programmed game controller for a gaming machine, wherein the game controller is programmed to receive inputs from a user interface and send control signals to one or more displays so as to implement the method described in the preceding paragraphs.

Further aspects of the present invention and further embodiments of the aspects described in the preceding paragraphs will become apparent from the following description, given by way of example and with reference to the accompanying drawings.

BRIEF DESCRIPTION OF THE DRAWINGS

Notwithstanding any other embodiments that may fall within the scope of the present invention, certain embodiments of the present invention will now be described, by way of example only, with reference to the accompanying figures, in which.

DESCRIPTION OF THE INVENTION

In broad terms, embodiments of the invention include a gaming method in which a player makes a pick or selection of possible outcomes before a potential award is revealed, said potential award is then revealed, and is then awarded in response to an event terminating in an outcome corresponding to a successful selection. This series of events may build suspense in a game, that may in turn provide a more entertaining game structure for game designers to work with.

The suspense may be further enhanced by providing a series of game events using this method, with the results of each game event combining, for example to move up or down a ladder to determine a final award from the series. Still further, there may be an opportunity to extend the series of game events, drawing out the series, which may provide increased opportunities for larger awards.

Further still, the method, whether implemented a single time or as a series may determine an award that operates on another game event or series of game events. In this way significant suspense may be created for example, by implementing the method following a trigger event and using the method to determine a multiplier or other operator that is applied to prizes won from a series of free games or other game event(s).

Figure 1:
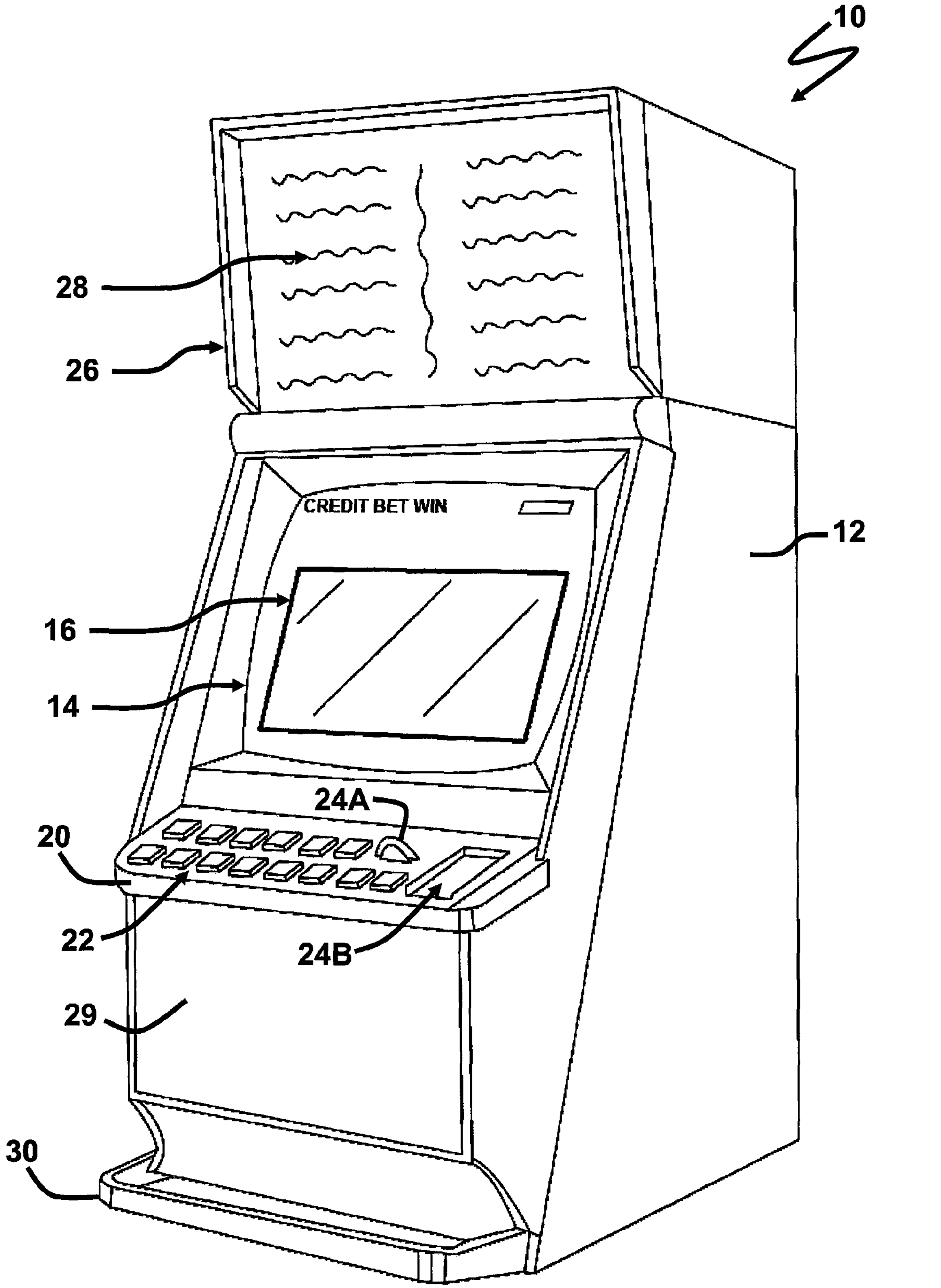
FIG. 1 shows diagrammatically, a view of a gaming machine suitable for implementing an embodiment of the present invention.

In FIG. 1 of the accompanying drawings, one example of a gaming machine suitable for implementing an embodiment of the present invention is generally referenced by arrow 10.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or a different type of display.

Figure 2:
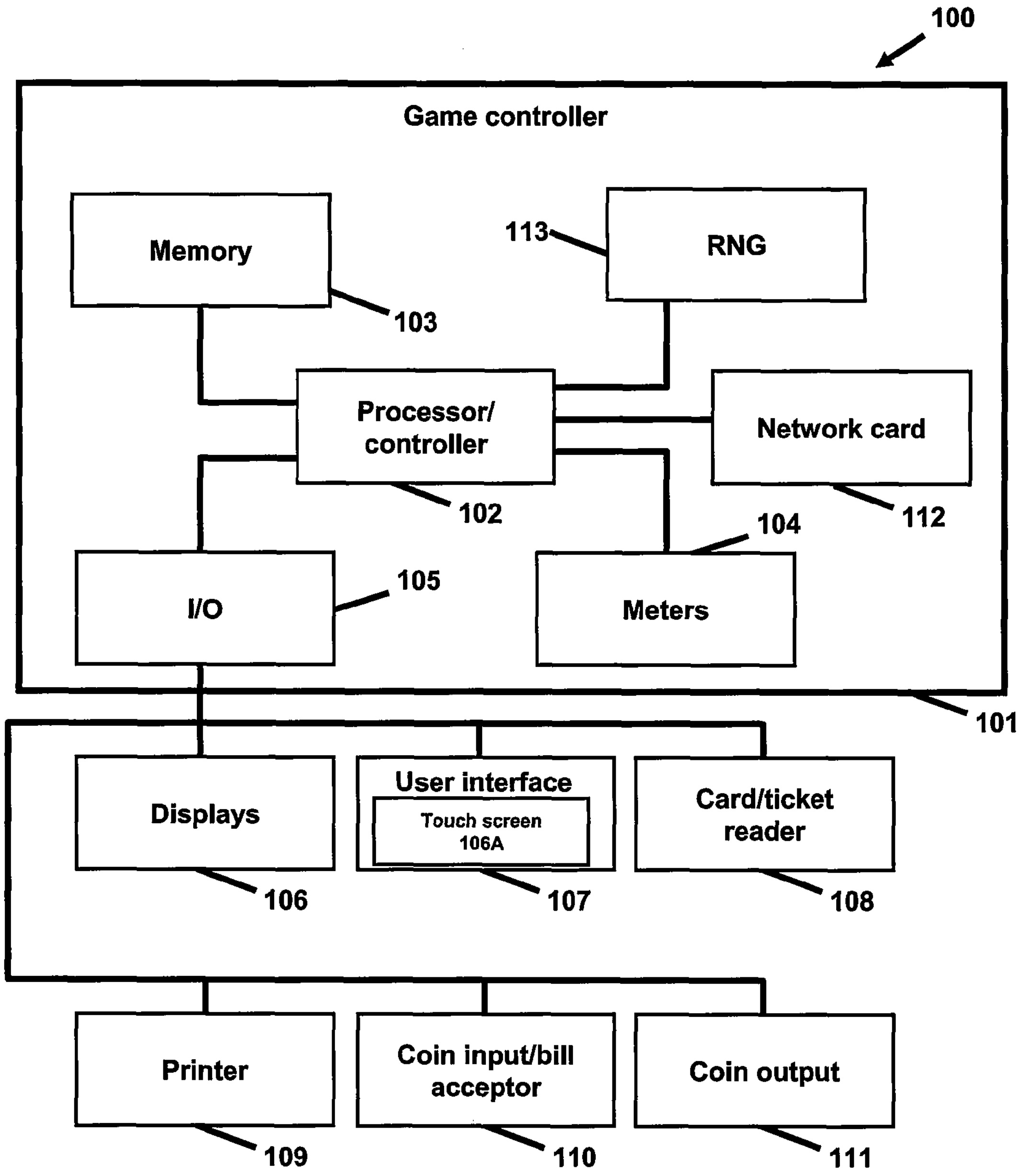
FIG. 2 shows a block diagram of gaming apparatus suitable for implementing an embodiment of the present invention.

FIG. 2 shows a block diagram of a gaming apparatus, generally referenced by arrow 100, suitable for implementing an embodiment of the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may also have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a microprocessor, microcontroller, programmable logic device or other computational device 102. Instructions and data to control operation of the computational device 102 are stored in a memory 103, which is in data communication with the computational device 102. Typically, the gaming apparatus 100 will include both volatile and non-volatile memory and more than one of each type of memory, with such memories being collectively represented by the memory 103. The instructions to cause the game controller 101 to implement an embodiment of the present invention will be stored in the memory 103.

The gaming apparatus may include hardware meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, user interfaces 107, a card and/or ticket reader 108, a printer 109, a bill acceptor and/or coin input mechanism 110 and a coin output mechanism 111. One or more of the displays 106 may include a touch screen 106A, forming part of the user interface 107. Additional devices may be included as part of the gaming apparatus 100, or devices omitted as required for the specific implementation.

In addition, the gaming apparatus 100 may include a communications interface, for example a network card 112. The network card, may for example, send status information, accounting information or other information to a central controller, server or database and receive data or commands from a the central controller, server or database. As explained in more detail in relation to FIG. 4, the computational device 102 may include two or more controllers or processors, which may be local or remote from each other and the displays 106.

Figure 3:
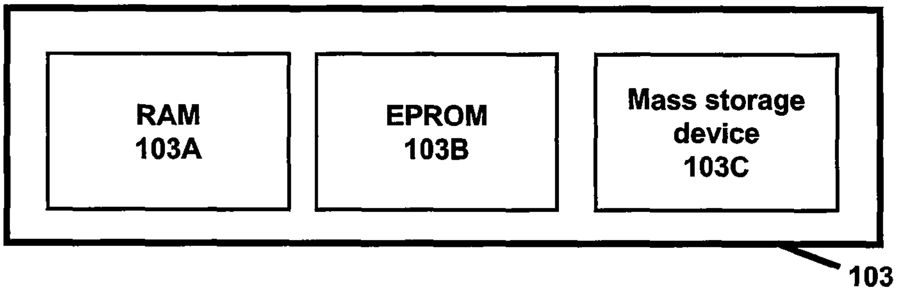
FIG. 3 shows a block diagram of components of the memory of the gaming apparatus represented in FIG. 2.

FIG. 3 shows an exemplary block diagram of the main components of the memory 103. The RAM 103A typically temporarily holds program files for execution by the computational controller 102 and related data. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere.

Figure 4:
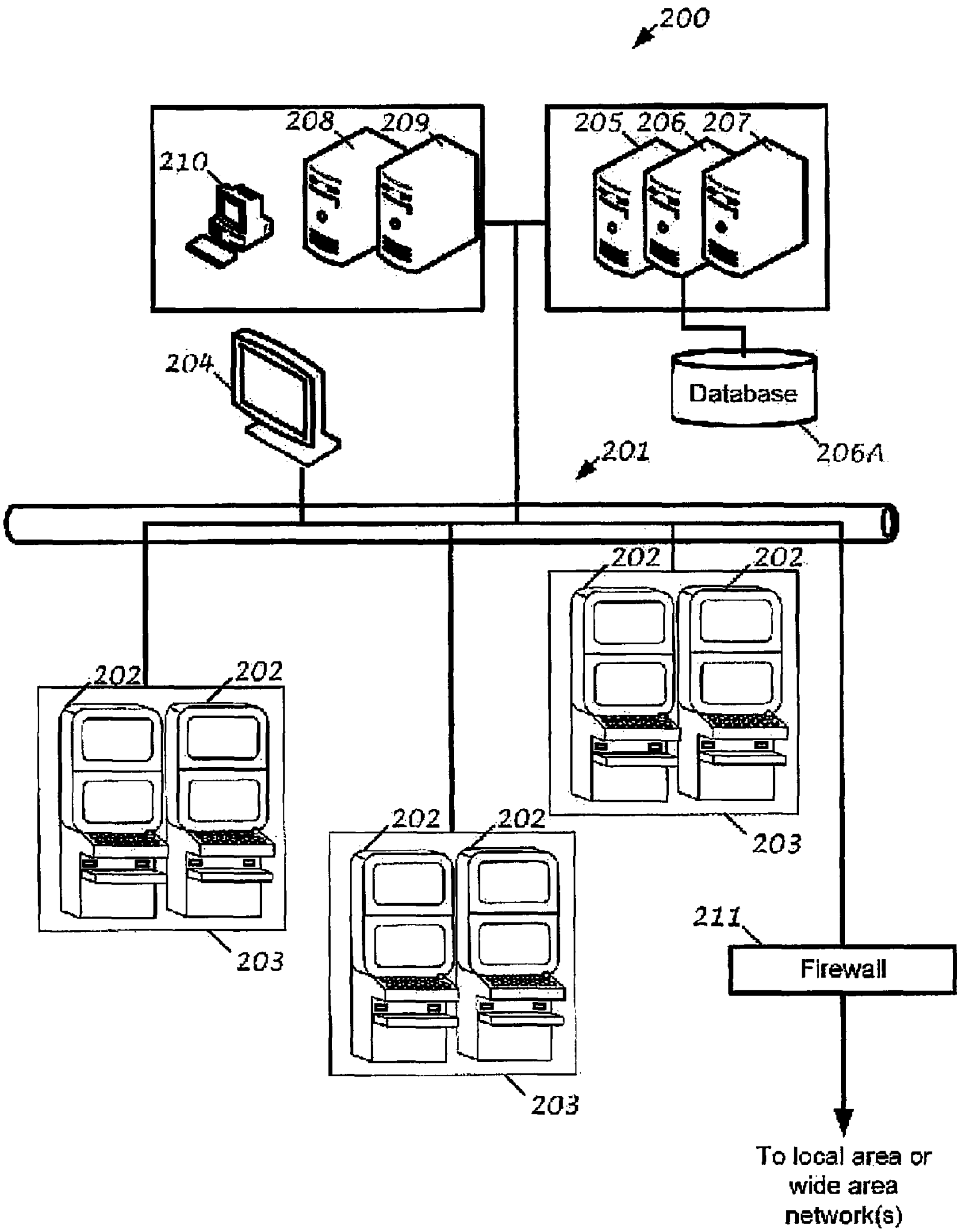
FIG. 4 shows, diagrammatically, a network gaming system suitable for implementing an embodiment of the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 may manage the storage of game programs and associated data for downloading or access by the gaming devices 202 in a database 206A, and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

A description will now be given of the operation of certain embodiments of the present invention. The following description assumes that certain embodiments of the present invention are implemented by the gaming machine 10, but as explained herein above, embodiments of the present invention may be implemented in other gaming systems, including across a gaming machine network.

Figure 5:
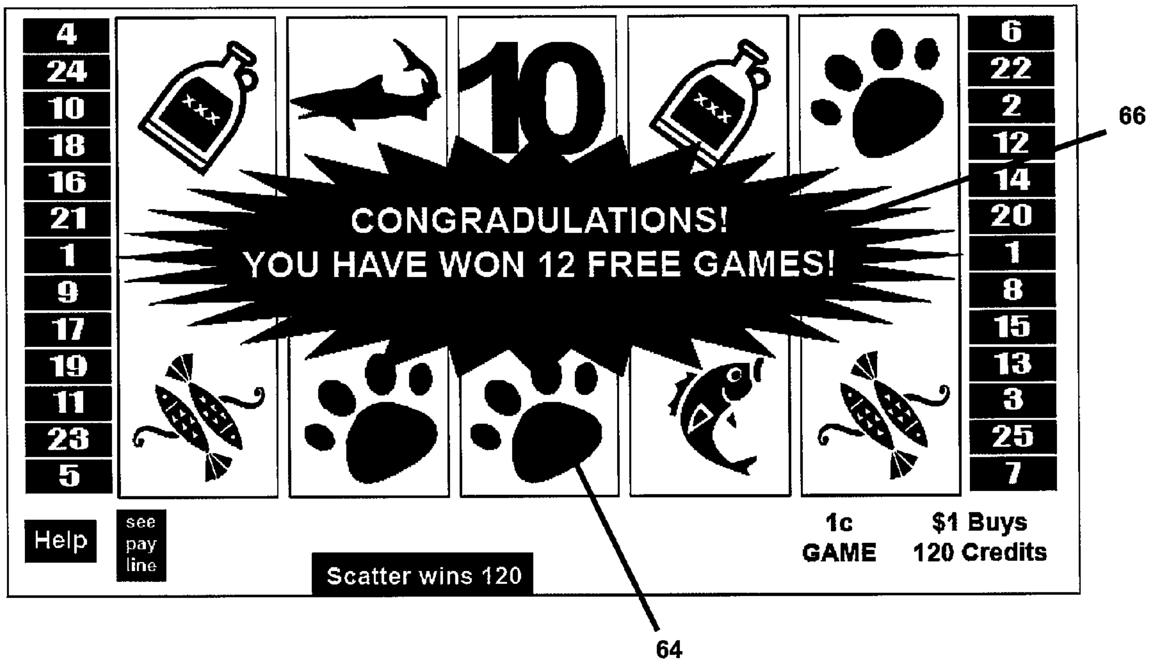
FIG. 5 shows a screen display of a first embodiment of a game of an embodiment of the invention in which the feature game is triggered.
Figure 11:
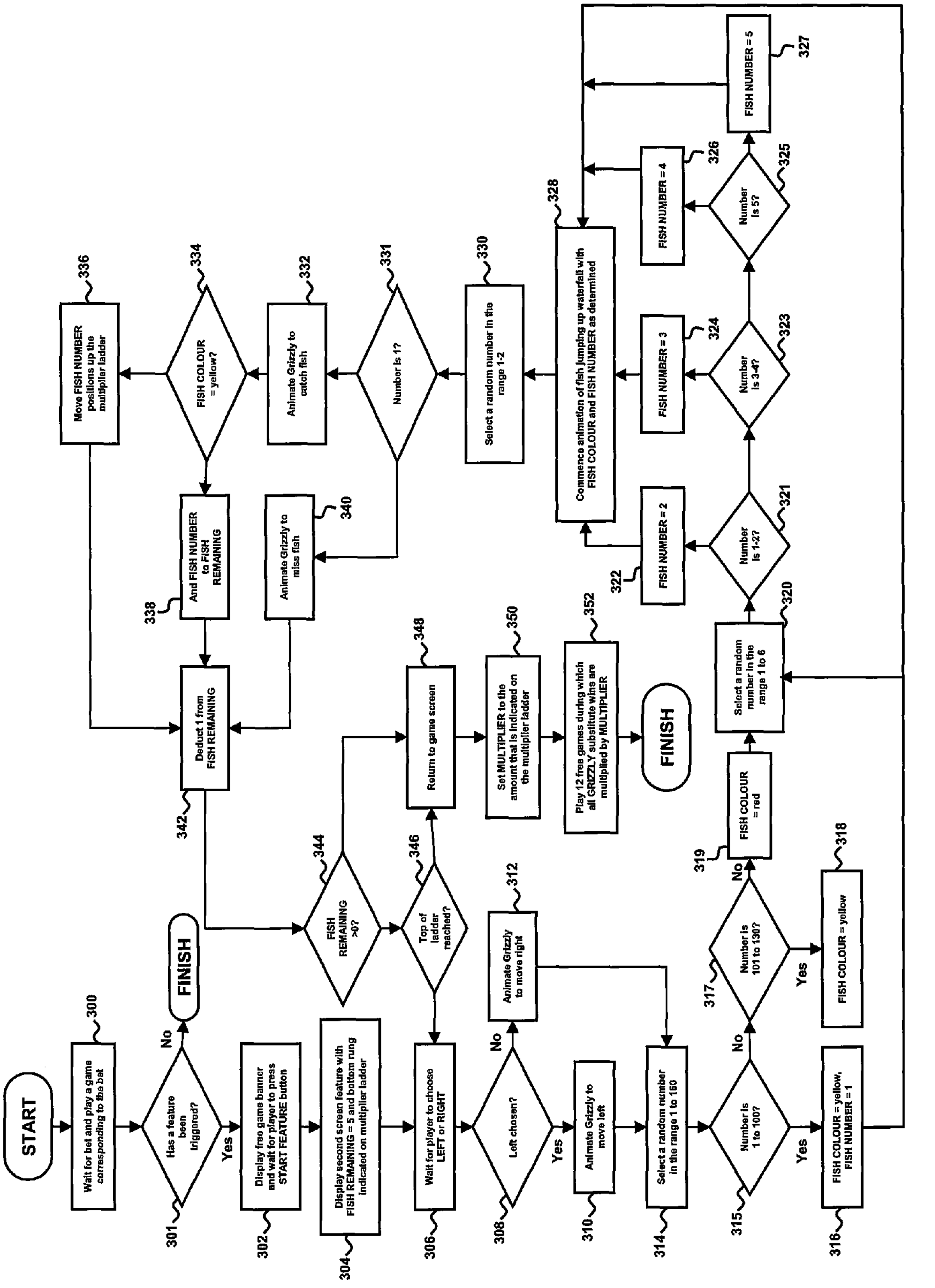
FIG. 11 shows a flowchart of the first embodiment of the present invention played on the gaming machine of FIG. 1 as implemented in game logic on the game controller.

The feature may be triggered in a number of ways. In this specific embodiment, as is illustrated in the flowchart of FIG. 11, after a bet has been placed to play the base game at step 300, the feature game may be triggered. As is shown in FIG. 5 in the event that the symbols of the spinning reel game include three or more scattered paw symbols 64, a feature game may be triggered (step 301) with a notification appearing on the screen 66 indicating that a feature has been triggered and that 12 free games have been awarded.

Figure 6A:
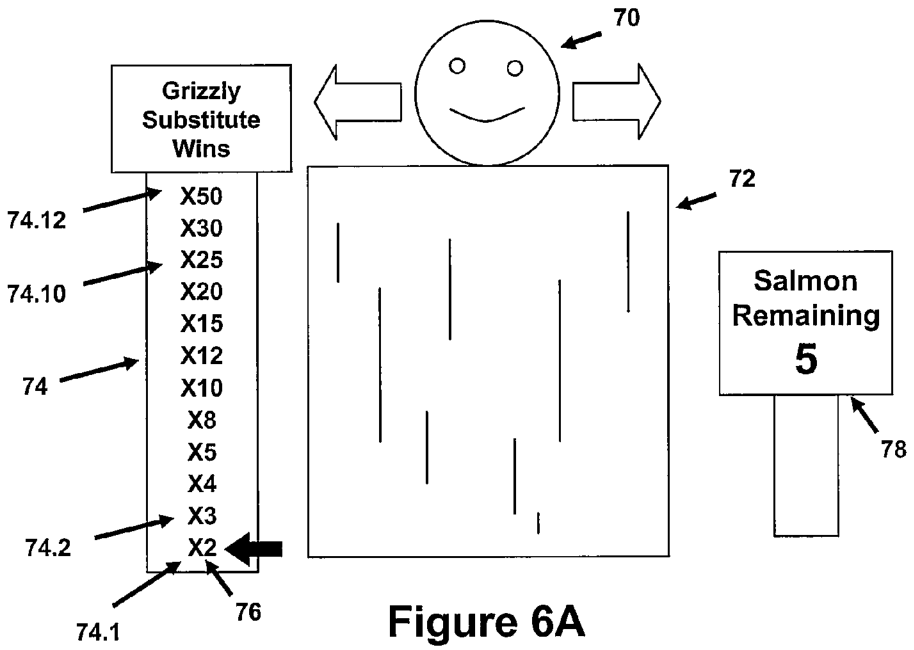
FIG. 6A shows a schematic representation of a screen display of a feature game triggered from FIG. 5.
Figure 6B:
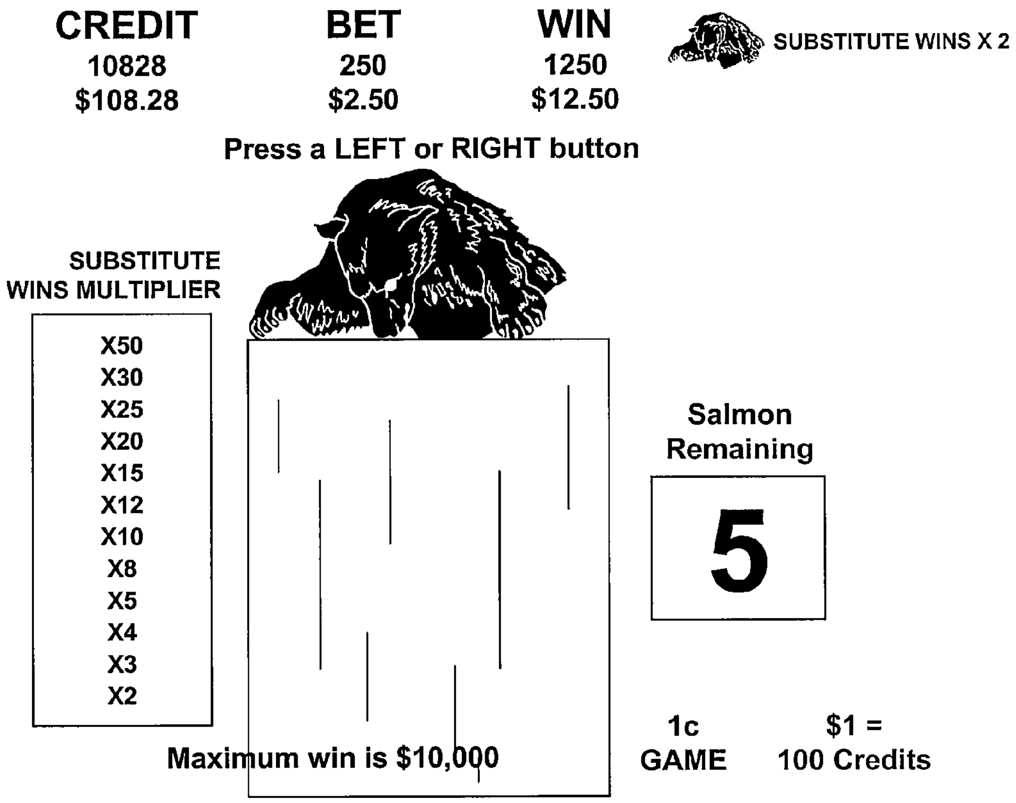
FIG. 6B shows a typical screen display of a feature game triggered from FIG. 5.

After the player has pressed the start feature button from the bank of buttons 22 (step 302) the feature game may commence. An example of a stylised representation of the second screen feature of the feature game is included as FIG. 6A, with a corresponding exemplary screenshot shown in FIG. 6B.

The screen shows a representation of a grizzly bear 70 on top of a waterfall 72. Also shown is a progressive prize ladder 74 in which a series of multipliers of different levels also appear and are shown as 74.1-74.12. The current multiplier may be represented by pointing to and highlighting the relevant level 76, or by some other means. Shown at the side of the screen is a scoreboard 78 representing the additional number of iterations of the feature game remaining, which in the example theme shown in the drawings relates to the number of fish remaining and is captioned in FIGS. 6A, 7A, 8A and 9 as "Salmon Remaining". At the start of the feature (step 304), the scoreboard 78 shows that five iterations of the feature game are left before the feature finishes, and the initial multiplier level 76 on the progressive prize ladder 74 may be set to a predetermined level, in the present embodiment x2.

The player commences the feature by selecting either "Left" or "Right" selectors (steps 306 and 308). The controller 101 may receive the player selection by a player touching left or right marked touch pads in the display 14, or by depressing left or right selector buttons in the bank of buttons 22.

Figures 7A, 7B:
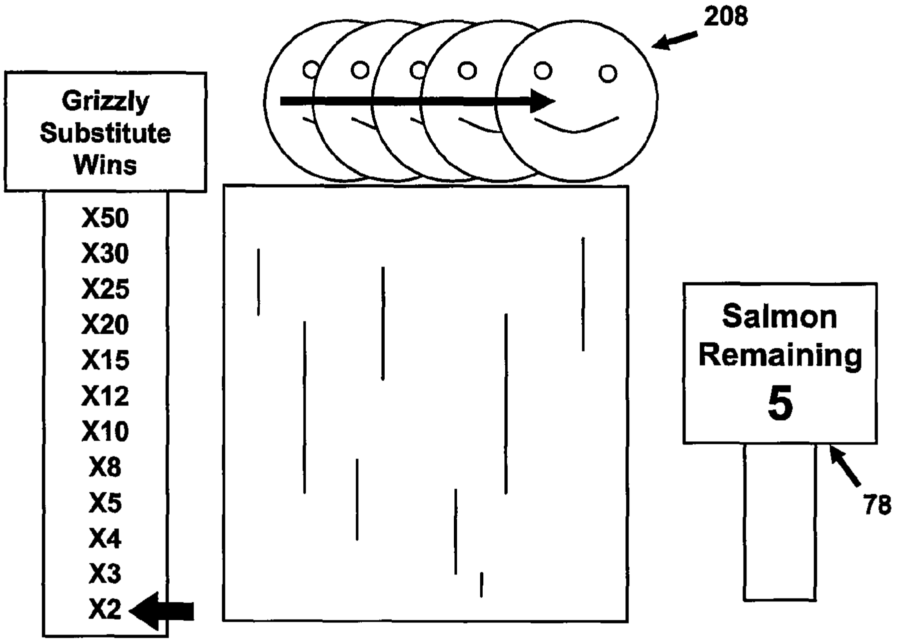
FIG. 7A shows a stylised version of the screen display of the feature game when the player has made a selection of "RIGHT".
FIG. 7B shows a typical table that may be used by an underlying RNG to determine which salmon will be introduced into the screen display of the feature game.
Figure 8A:
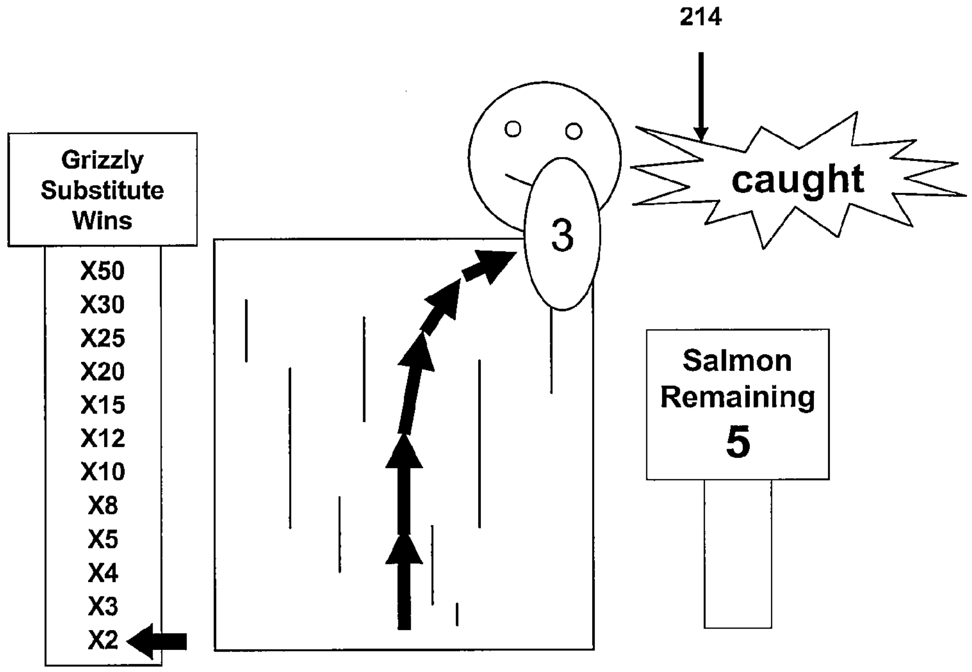
FIG. 8A shows a stylised version of the correct selection by a player.
Figure 8B:
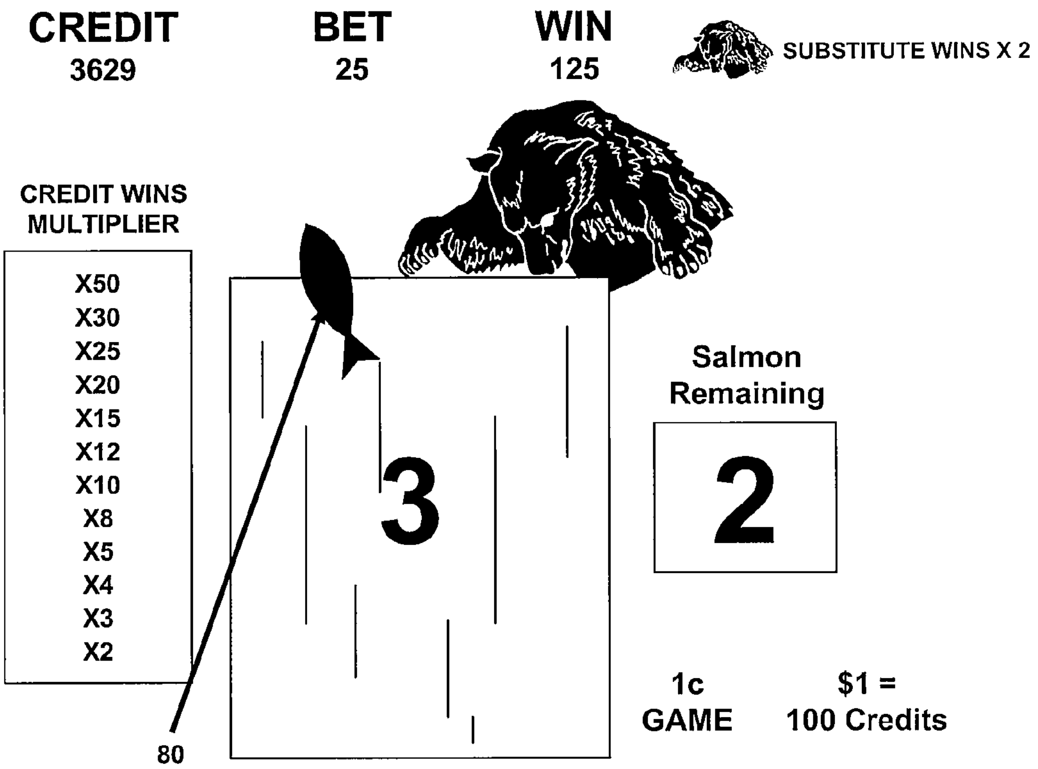
FIG. 8B shows a typical screen display once the player has made an incorrect selection of "RIGHT".
Figure 9:
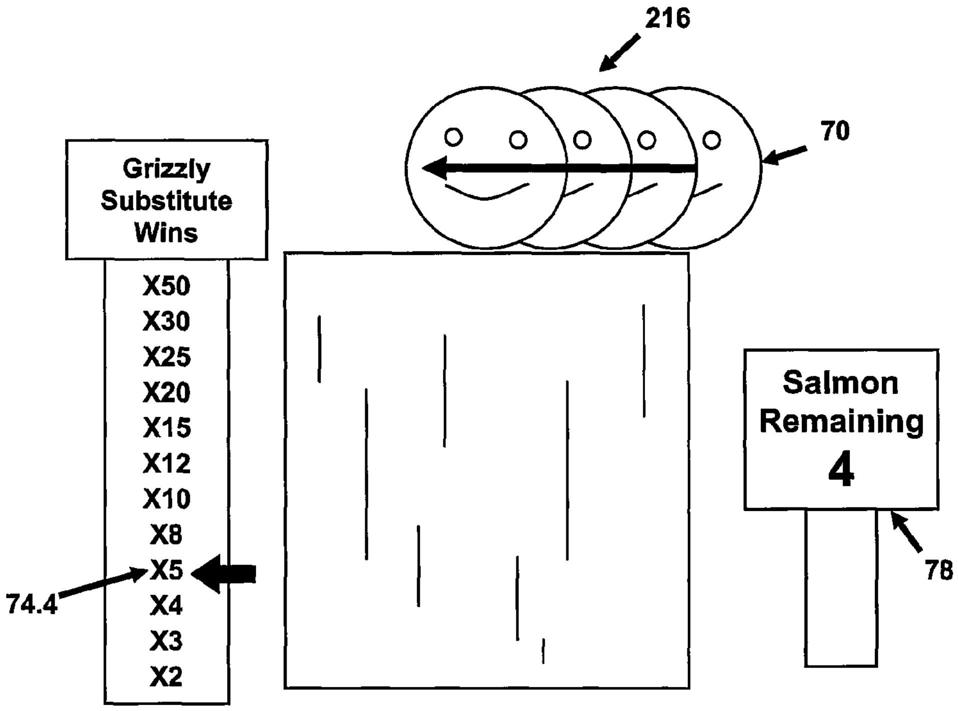
FIG. 9 shows a stylised version of the screen display at the beginning of the next iteration of the feature game after FIG. 8A.

After the player has chosen either the Left or Right direction, the grizzly 70 may be animated to move either Left (step 310) or Right (step 312), as shown in the stylised screen shot of FIG. 7A, and the screen display of FIG. 8B.

After the player has selected the direction by touching the relevant touch pad on the screen or by pressing the corresponding button, a random number may be generated (step 314) in the range 1-160. Depending on the outcome of the random number generation, a particular type of fish 80 may be generated, having both colour and number characteristics representative of the award.

As shown by reference to the table 212 of FIG. 7B, the fish 80 may either be yellow and have an assigned number 1 if the number is 1 to 100 (steps 315 and 316), or yellow if the number is 101 to 130 (steps 317 and 318) or red (step 319) if the number is 131 to 160. If the fish 80 does not have a number (e.g. yellow fish 1, red fish), then an additional random number may be generated (step 320) and a number assigned to a particular fish 80 from weighted table 213 of FIG. 7B, depending on the number selected. Numbers 1 and 2 result in a "2" allocation (steps 321 and 322). Numbers 3 and 4 result in a "3" allocation (steps 323 and 324), and numbers 5 and 6 result in a 4 and 5 allocation respectively (steps 325, 326 and 327). It can be seen that in the present embodiment the table has been weighted such that the chances of getting a "2" or a "3" are double that of getting a "4" or a "5".

The appropriately colored and numbered fish 80 is then animated in a suspense sequence to progress up the middle of the waterfall 72 from the base of the screen towards the location of the grizzly 70 (step 328).

At step 330 an additional random number is generated by the RNG 113, determining whether the fish 80 is to be caught or missed by the grizzly. The odds of catching a fish may be predetermined as being even, in that a range of 1 to 2 is provided (step 331).

If the random number is one, the fish is caught by the grizzly (step 332), which represents a winning outcome for the player. The fish is animated to swim left or right when it reaches the top of the waterfall 72 according to the position of the grizzly preselected by the player. As is shown in the stylised version of the screen display in FIG. 8A, the fish is animated to swim right, and the grizzly is animated to catch the fish at 214 (step 332).

If the fish that has been caught is yellow (step 334), then the current level marker 76 is moved up the progressive ladder 74 by the number appearing on the fish 80 (step 336) and the scoreboard 78 decremented by one. This is represented in the stylised version of the screen display shown in FIG. 9, in which the level marker is moved up to the x5 level 74.4, and the scoreboard 78 reads 4. The grizzly is then animated to move back to the centre, as is shown at 216.

Alternatively, if the fish 80 caught by the grizzly 70 is red, the number appearing on the fish may be added to the scoreboard 78, thereby increasing the number of iterations of the feature game (step 338).

Where the random number generated in step 330 is 2, this represents an unsuccessful outcome, and the fish 80 is animated so that it is missed by the grizzly, with the fish swimming to the side other than where the grizzly is located (step 340). This outcome is shown in the FIG. 8B screenshot.

After either a successful or unsuccessful outcome, one is deducted from the number of fish remaining on the scoreboard 78 (step 342). If the number of fish remaining is still greater than zero (step 344) and the top of the ladder 72 has not been reached (step 346), the process reverts to step 306 and the feature begins again with a player selection.

Alternatively, where the number of fish remaining on the scoreboard is 0 or where the top of the ladder has been reached, the display reverts back to the game screen (step 348). The multiplier value for the game screen is set to the amount indicated on the progressive ladder 74 at the time the feature game display concludes (step 350).

The screen then reverts to the underlying spinning reel game, and the series of twelve free games won by the player due to the occurrence of the trigger condition in step 352 commence.

Figure 10:
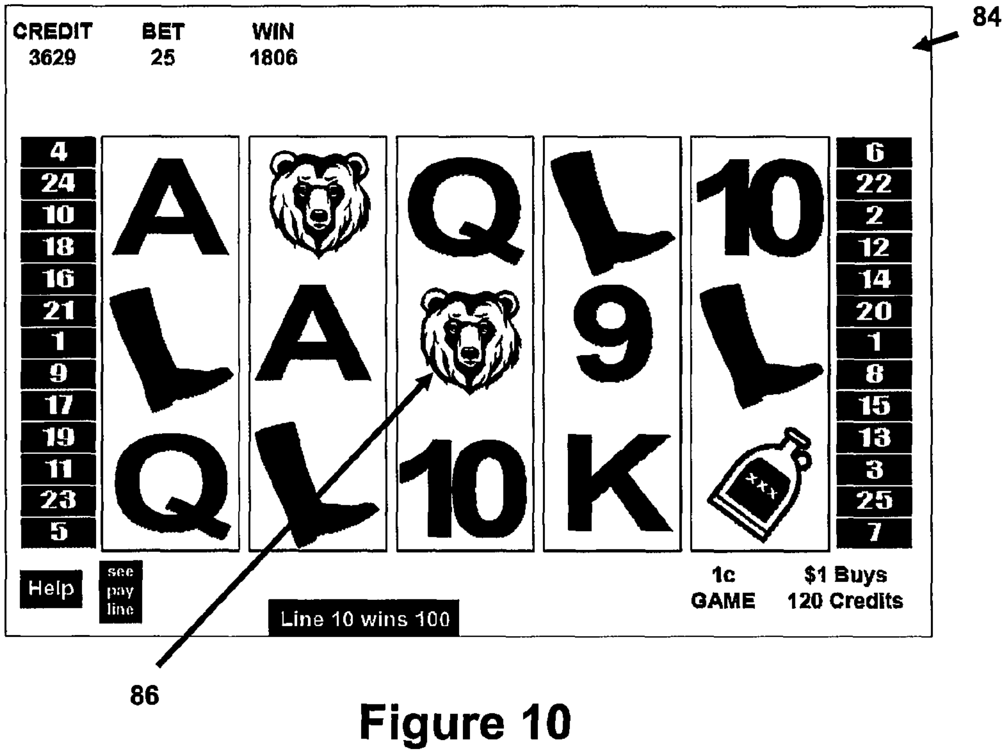
FIG. 10 shows a screen display of the free games of an embodiment of the present invention where a substitute symbol is multiplied by the outcome of the feature game.

During the play of these free games, a banner indicating the amount of the multiplier value 84 may be displayed on the screenshot of FIG. 10. Where a win occurs in the underlying spinning reel game, and that win involves the substitute grizzly symbol 86, the win is multiplied by the multiplier value 84. The role of the multiplier may be emphasised to the player by flashing the multiplier value 84 on and off in the play of the free games.

Following the conclusion of the free games and if the feature screen is not retriggered, the multiplier value 84 disappears from the screen, and normal play resumes. Alternatively, if the feature game is retriggered during play of the free games, the first series of free games will conclude, and then the feature game will recommence to determine the multiplier used in the second series of free games.

While the foregoing description has been provided by way of example of the preferred embodiments of the present invention as presently contemplated, which utilise gaming apparatus and machines, those skilled in the relevant arts will appreciate that the present invention also may have application to internet gaming and/or have application to gaming over a telecommunications network, where handsets are used to display game outcomes and receive player inputs.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A gaming machine comprising at least one display and a user interface in communication with a game controller, the gaming machine providing a game in which:

the gaming machine accepts a wager on one or more outcomes of the game and the gaming machine displays on a said display symbols representing the one or more outcomes;

if a winning combination of symbols occurs in at least one of the outcomes on which a wager has been accepted, the gaming machine awards an award associated with that winning combination;

on occurrence of a trigger event during play of the game, a second screen feature game is displayed on a said display, the second screen feature game comprising a plurality of potential prizes arranged in a scale of potential prizes and a series of game events, wherein for each game event in the series, a player-selectable choice is given to select between at least two options, the gaming machine detecting operation of the user interface to determine which option has been selected;

in the second screen feature game, the game controller randomly determines if the selected option is a winning choice, and randomly determines a prize award from among a plurality of prize awards that is won if the selected option is a winning choice, wherein the prize awards available for determination comprise at least two different characteristics, a first of the characteristics being 1) one or more additional plays of the second screen feature game, or 2) movement along the scale of potential prizes, and a second of the characteristics being a value of movement along the scale of potential prizes, and wherein the at least two characteristics are randomly determined by the game controller; and on completion of the second screen feature game, the gaming machine awards a bonus prize based on the scale of potential prizes depending on where on the scale of potential prizes the second screen feature game ended and subsequently provides a bonus game which is separate of the second screen feature game and comprises an outcome which is affected by the prize award won in the second screen feature game.

2. The gaming machine of claim 1, wherein the scale of potential prizes comprises at least one prize that is a multiplier for the bonus game.

3. The gaming machine of claim 2, wherein the bonus game comprises a series of individual games, each involving the gaming machine displaying symbols on a said display, wherein the outcome comprises a winning combination of the displayed symbols and whereby the multiplier operates to multiply a predefined award value associated with the winning symbol combination by an amount corresponding to a value of the prize award.

4. The gaming machine of claim 3, wherein the bonus game has the same screen format as the game in which the trigger event may occur.

5. The gaming machine of claim 4, wherein the bonus game and the game in which the trigger event may occur are both spinning reel games and are both displayed on the same display.

6. The gaming machine of claim 5, wherein the bonus game is a series of spins of the reels in the spinning reel game for which an additional wager is not made.

7. The gaming machine of claim 1, wherein the scale of potential prizes comprise prizes that progressively increase in value and wherein during the second screen feature it is only possible to either remain at the same position on the scale or move along the scale of prizes to a higher value prize.

8. The gaming machine of claim 1, wherein the second screen feature game comprises an animation sequence that represents the determination as to whether a winning choice has been made.

9. A gaming machine comprising at least one display and a user interface in communication with a game controller, wherein:

the game controller receives inputs from the user interface and determines from the inputs a wager that is to be staked on one or more outcomes of the game;

following the staking of a said wager, the game controller determines the one or more outcomes of the game;

the game controller controls a said display to display symbols representing the one or more outcomes;

the game controller determines if a winning combination has occurred in at least one of the outcomes on which a wager has been made and causes the gaming machine to award an award associated with that winning combination;

the game controller monitors for occurrence of a trigger event during play of the game and in response, implements a second screen feature game comprising a series of game events and causes representations of the second screen feature to be displayed on a said display;

the gaming machine has in memory a definition of a plurality of potential prizes that together define a scale of potential prizes, each of the plurality of potential prizes being operable to affect at least one outcome of a bonus game controlled by the game controller;

the user interface comprises a selector and for each game event in the series of game events, the game controller determines from operation of the selector if a player-selectable choice of one of a plurality of options has been made;

the game controller randomly determines if the selected option is a winning choice, and randomly determines a prize award from among a plurality of prize awards that is won if the selected option is a winning choice, wherein the prize awards available for determination comprise at least two different characteristics, a first of the characteristics being 1) one or more additional plays of the second screen feature game, or 2) movement along the scale of potential prizes, and a second of the characteristics being a value of movement along the scale of potential prizes, and wherein the at least two characteristics are randomly determined by the game controller; and on completion of the second screen feature game, the gaming machine awards a bonus prize based on the scale of potential prizes depending on where on the scale of potential prizes the second screen feature game ended and subsequently implements play of the bonus game.

10. The programmed game controller of claim 9 wherein the programmed game controller forms a part of a gaming machine comprising a user interface and a display.

* * * * *